(12) United States Patent
Fleury et al.

(10) Patent No.: US 7,776,988 B2
(45) Date of Patent: Aug. 17, 2010

(54) METHOD FOR THE PREPARATION OF ORGANOPOLYSILOXANE BY POLYMERIZATION AND REARRANGEMENT OF CYCLIC SILOXANES

(75) Inventors: Etienne Fleury, Irigny (FR); Jean-Manuel Mas, Millery (FR); Kamel Ramdani, Lyons (FR)

(73) Assignee: Rhodia Chimie, Aubervilliers (FR)

( * ) Notice: Subject to any disclaimer, the term of this patent is extended or adjusted under 35 U.S.C. 154(b) by 0 days.

(21) Appl. No.: 11/998,432

(22) Filed: Nov. 30, 2007

(65) Prior Publication Data
US 2008/0306236 A1 Dec. 11, 2008

Related U.S. Application Data

(63) Continuation of application No. 11/785,237, filed on Apr. 16, 2007, now abandoned, and a continuation of application No. PCT/FR2005/002543, filed on Oct. 14, 2005.

(30) Foreign Application Priority Data

Oct. 15, 2004 (FR) .................................. 0410937

(51) Int. Cl.
C08G 77/08 (2006.01)
C08G 77/12 (2006.01)
C08G 77/16 (2006.01)

(52) U.S. Cl. ........................ 528/14; 525/477; 528/21; 528/23; 528/37

(58) Field of Classification Search .................... 528/14
See application file for complete search history.

(56) References Cited

U.S. PATENT DOCUMENTS 4,138,543 A 2/1979 Bargain et al.
4,308,366 A * 12/1981 Millet ........................ 525/477
4,362,855 A * 12/1982 Millet et al. .................. 528/14

* cited by examiner

*Primary Examiner*—Ling-Siu Choi
*Assistant Examiner*—Chun-Cheng Wang
(74) *Attorney, Agent, or Firm*—Buchanan Ingersoll & Rooney PC

(57) ABSTRACT

The invention relates to silicon oils, more particularly, to a novel method for the preparation of a silicon oil by polymerization and rearrangement of cyclic siloxanes in the presence of an alkaline catalyst and a co-catalyst which is a cryptand (macroheterobicyclic diamine) acting as a polymerization accelerator.

17 Claims, No Drawings

METHOD FOR THE PREPARATION OF ORGANOPOLYSILOXANE BY POLYMERIZATION AND REARRANGEMENT OF CYCLIC SILOXANES

CROSS-REFERENCE TO PRIORITY/PCT APPLICATIONS

This application is a continuation of U.S. patent application Ser. No. 11/785,237, filed Apr. 16, 2007 now abandoned, and claims priority under 35 U.S.C. §119 of FR 0410937, filed Oct. 15, 2004, and is a continuation of PCT/FR 2005/002543, filed Oct. 14, 2005, designating the United States (published in the French language on Apr. 27, 2006 as WO 2006/042944 A1; the title and abstract were published in English), each hereby expressly incorporated by reference in its entirety and each assigned to the assignee hereof.

The field of the invention is that of the synthesis of silicones by ring-opening polymerization and/or redistribution polymerization of cyclic polyorganosiloxanes and of linear and/or nonlinear polyorganosiloxanes.

More specifically, the present invention relates to a novel process for the preparation of a silicone oil by polymerization and rearrangement of cyclic siloxanes in the presence of an alkaline catalyst and of a cocatalyst which is a cryptand of the macroheterobicyclic diamine type acting as polymerization accelerator.

Silicones are nowadays widely used industrially. Most of them are polymerized siloxanes or are based on these derivatives. For this reason, the synthesis of these polymers by ring-opening polymerization is a very important line of research and numerous publications have appeared on the subject. The ring-opening polymerization of oligosiloxanes uses monomers which can be readily synthesized and purified and, in addition, it makes possible better control of the molecular weight of the polymer obtained. In practice, this method is one of the industrial routes used nowadays.

The ring-opening polymerization (ROP) of cyclic organosiloxanes is a technique widely used in the silicones industry to prepare functionalized or nonfunctionalized oils, gums or resins.

The ring-opening polymerization of oligosiloxanes is a complex process:

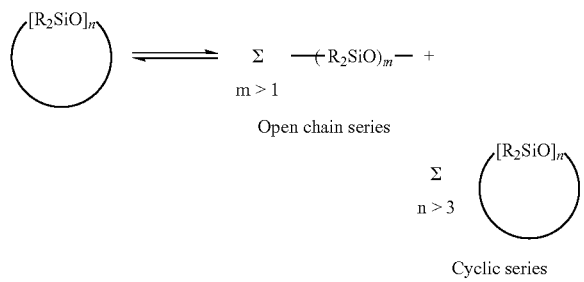

The monomers most often used currently are octamethylcyclotetrasiloxane (D4) and hexamethylcyclotrisiloxane (D3). The polymerization can be carried out by the anionic route, via basic catalysts, or the cationic route, via acid catalysts.

The cationic route is often preferred for the synthesis of linear polyorganosiloxane oils of low viscosity. For the cationic polymerization, catalysts of Brönsted acid or proton acid type, such as $H_2SO_4$, $HClO_4$ or triflic acid, are widely described. These acids can also be placed on solid supports, for example inorganic supports. These catalysts are effective at moderate temperatures, for example of the order of 50 to 100° C. Lewis acids, such as $AlCl_3$, $SbCl_5$ or $SnCl_4$, may also be suitable but require high temperature conditions (>200° C.). Phosphonitrile halides with the structure $Cl_3PNPCl_2NPCl_3.PCl_6$ are also described as effective catalysts for ring-opening polymerization at temperatures of 40 to 120° C. They are also good condensation catalysts.

The anionic route is more often used for the formation of linear polymers of high molecular weight. This process comprises 3 stages:

1) the initiation phase is the attack on the siloxane by the base to result in the formation of a silanolate at the chain end:

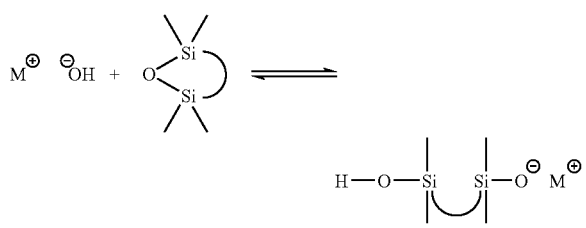

2) extension-shortening of the chains:

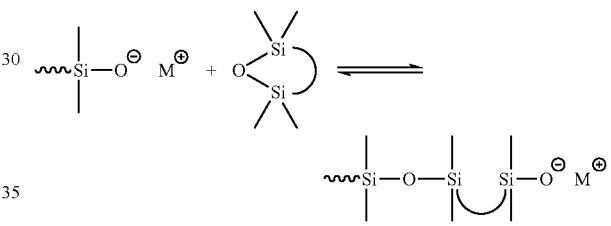

3) interchain exchanges (mixing of chains, redistribution):

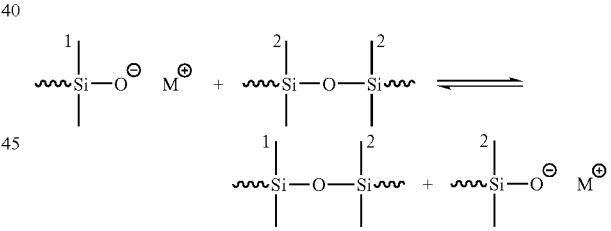

M corresponds to an alkali metal or to an alkaline earth metal in the above schemes.

When the equilibrium conditions are reached, a mixture of cyclic polyorganosiloxanes and of linear polyorganosiloxanes is obtained.

Many different initiators are used to carry out this polymerization, for example alkali metal or alkaline earth metal hydroxides or complexes of alkali metal or alkaline earth metal hydroxides with alcohols, and alkali metal or alkaline earth metal silanolates. The latter make it possible to avoid the initiation stage. The polymerization reaction requires a high temperature. The reaction can be carried out under dry conditions, in a solvent or as an emulsion. The polymerization can be halted by using an acid additive which reacts with the initiator or with the polymer chains to render the latter unreactive. Furthermore, these additives can be used to regulate the molecular weight of the polymer and/or to add an advantageous property. In the majority of cases, the residues from the initiator remain in the polymer produced or are removed. This is highly disadvantageous to the industrial process for ring-opening polymerization and/or redistribution polymerization of cyclic polyorganosiloxanes in the presence of $K^+OH^-$ or $SiO^-M^+$, which process has in addition the major disadvantage of being lengthy. The kinetics of this reaction are related to the nature of the anion and of the counterion. For an identical anion, the bulkier and softer the counterion, the faster the kinetics (for example, $Li^+<Na^+<K^+<NR_4^+<PR_4^+$). The solubility of the initiator in the reaction medium is also very important with regard to the kinetics. Thus, potassium hydroxide (KOH) is not very soluble and thus has to be employed under high temperature conditions ($\geq 150°$ C.).

Various techniques have been provided with the aim of accelerating the polymerization rate. For example, French patent application No. 2 353 589 and European patent application No. 0 039 299 describe processes for the bulk polymerization of cyclic siloxanes in the presence of linear polysiloxanes, acting as blocker of the polymerization reaction, which is accelerated by the presence of a catalytic system composed of an alkaline catalyst (or anionic polymerization initiator) and of a cocatalyst which is a macroheterocyclic complexing agent (known as cryptand), such as derivatives of tris(oxaalkyl)amine or monocyclic and bicyclic polyamines. These cocatalysts were described for the first time in French patent application No. 2 201 304. These macroheterocyclic compounds are known to have an ability to form stable complexes with compatible cations. The general understanding with regard to the method of action of these cocatalysts may be summarized thus:

each heterocyclic molecule is capable of forming a complex with a cation. This is because these complexing agents have complexing properties with regard to the metal cations, in particular the cations of Groups I and II of the Periodic Table of the Elements, provided by the anionic initiators, these metal cations fitting into the intramolecular cavities of said complexing agents with the formation of "cryptates". The bridges between the nitrogen atoms thus form, with one another, "a cage" in which the cation is caught.

The ability to form complexes and the stability of the complexes formed depend on the arrangement of the heteroatoms or of the groups surrounding the cation and on the relative diameters of the rings or of the cation.

However, the use of this type of cocatalyst results in costs which are prohibitive for an industrial use as these cocatalysts have to be used as an equimolar mixture with the catalyst because of their method of action on the catalysis. The removal or the separation of compounds of this type from the oils synthesized is rather difficult and all the more increases the cost of the process. This is all the more important during the preparation of silicone oils participating in crosslinking compositions intended for elastomeric coating applications where the coatings have to meet the restrictions imposed by the "food-grade" label (for example, coatings for pastry dishes, and the like).

The industries of the technical field under consideration are thus waiting for a novel process using an alkaline catalytic system which makes possible rapid polymerization kinetics while being effective with regard to the speed with which a viscosity plateau is obtained during polymerization. This is because it is difficult to stabilize as rapidly as possible the viscosity during polymerization toward a viscosity plateau similar to the viscosity desired for the final product. This plateau corresponds to the polymerization equilibrium of this reaction and is thus an important criterion of the reaction.

Furthermore, improvements are always desirable in terms of savings and in terms of industrial operating conditions.

Faced with this state of the art, one of the essential objects of the invention is to provide a novel process for the preparation of polyorganosiloxanes by ring-opening polymerization and/or redistribution polymerization of cyclic polyorganosiloxanes and of linear and/or nonlinear polyorganosiloxanes by the anionic route via basic catalysts in which the achievement of a viscosity plateau during polymerization is rapid and without exhibiting the disadvantages of the prior art which are presented above.

Another essential object of the invention is to provide a novel process for the preparation of polyorganosiloxanes by ring-opening polymerization and/or redistribution polymerization of cyclic polyorganosiloxanes and of linear and/or nonlinear polyorganosiloxanes which is simple and economic to implement, in particular as regards the final purification stages.

Another essential object of the invention is to provide a novel process for the preparation of polyorganosiloxanes by ring-opening polymerization and/or redistribution polymerization of cyclic polyorganosiloxanes and of linear and/or nonlinear polyorganosiloxanes by means of a high-performance catalytic system which exhibits at least one of the following characteristics:

of reducing the residues from the catalyst and from its derivatives in the final polymer, in order to prepare silicone polymers of high viscosity and of improved thermal stability, this being achieved in profitable fashion;

of rapidly obtaining a viscosity plateau during polymerization; and of guaranteeing high reproducibility.

These objects, among others, are achieved by the present invention, which relates to a process for the preparation of polyorganosiloxanes by ring-opening polymerization and/or redistribution polymerization of cyclic polyorganosiloxanes and of linear and/or nonlinear polyorganosiloxanes comprising the following stages:

a) a polymerization stage, in which:

a-1) a reaction composition is prepared at ambient temperature comprising:

at least 20% by weight, preferably at least 50% by weight, with respect to the total weight of the composition, of at least one cyclic siloxane of following formula (I):

with:

n=3,4,5,6,7 or 8;

the symbol $R^1$ represents: a hydrogen atom, an optionally substituted, linear or branched, $C_1$-$C_{12}$ alkyl radical, an alkenyl radical, an optionally substituted $C_5$-$C_{10}$ cycloalkyl radical, an optionally substituted $C_6$-$C_{18}$ aryl radical or an optionally substituted aralkyl radical, and the symbol $R^2$ represents a radical such as $R^1$ or an —$OR^3$ radical, with $R^3$ being a hydrogen atom or an optionally substituted, linear or branched, $C_1$-$C_{12}$ alkyl radical; and optionally up to 80% by weight, preferably up to 50% by weight, with respect to the total weight of the composition, of at least one polyorganosiloxane comprising siloxyl units, which are identical to or different from one another, of general formula (II):

with:

w and z=0, 1, 2 or 3 and w+z 3;

the symbol $R^3$ represents: a hydrogen atom, a linear or branched $C_1$-$C_{12}$ alkyl radical which is optionally substituted by one or more atoms, such as chlorine and/or fluorine, an optionally substituted $C_1$-$C_{12}$ alkenyl radical, an optionally substituted $C_1$-$C_{12}$ haloalkyl radical, an optionally substituted $C_1$-$C_{12}$ haloalkenyl radical, an optionally substituted $C_3$-$C_8$ cycloalkyl radical, an optionally substituted $C_3$-$C_8$ cycloalkenyl radical, an optionally substituted $C_3$-$C_4$ cyanoalkyl radical or an optionally substituted $C_6$-$C_{12}$ phenyl, alkylphenyl or phenylalkyl radical; and the symbol $R^4$ is a radical such as $R^3$ or an —$OR^5$ radical with $R^5$ having the same definition as $R^3$;

a-2) a catalytic system is added, preferably at a temperature of greater than or equal to 100° C., which catalytic system is composed of x mmol of at least one alkaline catalyst (III) and of y mmol of at least one cryptand (IV) which is a macroheterobicyclic diamine, and a-3) the temperature of the reaction mixture is brought to a temperature of between 100 and 190° C., preferably between 140 and 180° C.;

b) a neutralization stage is carried out; and c) optionally a devolatilizition stage is carried out, preferably at a temperature of between 175 and 185° C.; said process being characterized in that:

for the alkaline catalyst (III), the number of mmol x used meets the following criterion: 0.005×5 mmol per 500 g of cyclic siloxane (I), preferably 0.005×1 mmol per 500 g of cyclic siloxane (I), and for the cryptand (IV), the number of mmol y used meets the criterion defined by the molar ratio y/x<0.040,preferably by the molar ratio y/x<0.020 and more preferably still by the molar ratio y/x<0.010.

The term "cycloalkyl" is understood to mean a saturated, mono- or polycyclic, preferably mono- or bicyclic, hydrocarbon group preferably exhibiting from 3 to 8 carbon atoms. The term "saturated polycyclic hydrocarbon group" is understood to mean a group exhibiting two or more cyclic nuclei attached to one another via σ bonds and/or fused two by two. Examples of polycyclic cycloalkyl groups are adamantane and norbornane. Examples of monocyclic cycloalkyl groups are cyclopropyl, cyclobutyl, cyclopentyl, cyclohexyl, cycloheptyl and cyclooctyl.

The term "alkenyl" is understood to mean an unsaturated, substituted or unsubstituted, linear or branched, hydrocarbon chain exhibiting at least one olefinic double bond and more preferably a single double bond. Preferred examples of alkenyl groups are allyl and homoallyl groups.

It is to the credit of the inventors to have overcome the technical preconception which required that, until then, an equimolar ratio of cryptand with regard to the catalyst was necessary for the implementation of this type of catalysis for the synthesis of polyorganosiloxanes by ring-opening polymerization and redistribution polymerization of cyclic polyorganosiloxanes.

Despite all this, the inventors did not hesitate to carry out lengthy and numerous tests, at the end of which they demonstrated, entirely surprisingly and unexpectedly, that, for a specific category of cryptand, in this case macroheterobicyclic diamines, the cryptand/alkaline catalyst molar ratio for the preparation of polyorganosiloxanes by anionic polymerization can be less than 0.040, preferably less than 0.020 and more preferably still less than 0.010.

The process according to the invention is not only just as effective as formerly but also economic. In addition, it is simple to implement since the purification operations are simplified due to the reduced amount of cocatalyst used. This advantage is all the more appreciable in the preparation of silicone oils participating in crosslinking compositions intended for elastomeric coating applications in which the coatings have to meet the restrictions imposed by the "food-grade" label (for example, coatings for pastry dishes, and the like).

This process makes possible access to polyorganosiloxanes of variable viscosity, including polyorganosiloxanes of high viscosity.

Within the meaning of the invention, "ring-opening polymerization" corresponds to a polymerization in which a cyclic compound (monomer) is opened to form a linear polymer.

Within the meaning of the invention, "redistribution polymerization" has the meaning accepted by a person skilled in the art of the chemistry of silicones. In particular, "redistribution polymerization" is understood, in the field of silicones, as a rearrangement of organosiloxanes with different structures and/or with different molar masses. This rearrangement results in a single new polyorganosiloxane.

According to a first embodiment of the process according to the invention, the cryptand (IV) is a macroheterobicyclic diamine of general formula (V):

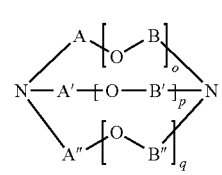

in which:

o, p and q=1, 2 or 3;

the symbols A, A', A", B, B' and B", which can be identical or different, represent groups of formulae: —$CH_2$—CHR—; —$CH_2$—CHR—$CH_2$—; —CHR—$CH_2$—$CH_2$—;

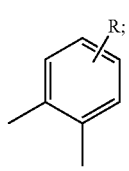 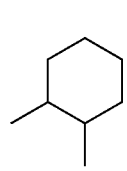 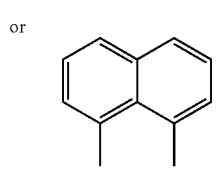

with R being a hydrogen or a linear or substituted $C_1$-$C_{20}$ hydrocarbon radical. Examples of alkyl groups are in particular methyl, ethyl, isopropyl, n-propyl, tert-butyl, isobutyl, n-butyl, n-pentyl, isoamyl, 1,1-dimethylpropyl, n-decyl, undecyl, dodecyl, tridecyl, tetradecyl, pentadecyl, hexadecyl, heptadecyl, octadecyl, nonadecyl and eicosyl.

According to a second embodiment of the process according to the invention, the cryptand (IV) is chosen from the group consisting of the following molecules (VI) to (IX):

(VI)

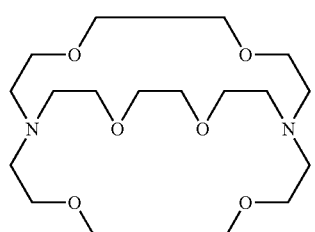

KRYPTOFIX 222

(VII)

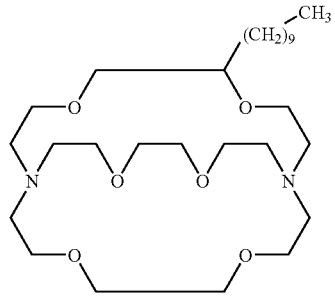

KRYPTOFIX 222 D (VIII)

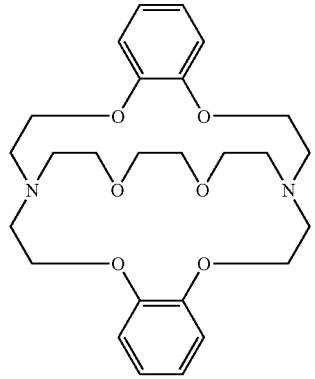

KRYPTOFIX 222 BB (IX)

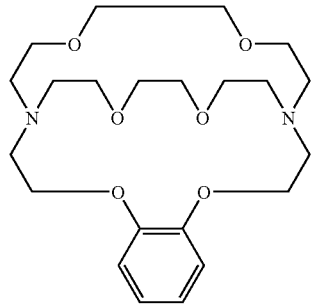

KRYPTOFIX 222 B

In these oligocyclosiloxanes of formula (I), $R^1$ is preferably chosen from alkyl groups having from 1 to 8 carbon atoms inclusive, optionally substituted by at least one halogen atom, advantageously from the methyl, ethyl, propyl and 3,3,3-trifluoropropyl groups, and also from aryl groups and advantageously from the xylyl and tolyl and phenyl radicals.

Advantageously, the cyclic siloxane of formula (I) is chosen from the group consisting of: octamethylcyclotetrasiloxane (D4), hexamethylcyclotrisiloxane (D3), octaphenylcyclotetrasiloxane, tetramethylcyclotetrasiloxane, tetramethyltetravinylcyclotetrasiloxane, hexamethyl-1,1-diphenylcyclotetrasiloxane, $[(CH_3)_2SiO]_5$, $[(CH_3)_2SiO]_6$, $[(CH_3)_2SiO]_7$, $[(CH_3)_2SiO]_8$, $[(CH_3)_2SiO]_9$, $[(CH_3)(C_2H_5)SiO]_3$, $[(CH_3)(C_2H_5)SiO]_4$, $[(CH_3)(C_2H_5)SiO]_5$, $[(CH_3)(C_2H_5)SiO]_6$, $[(C_2H_5)_2SiO]_3$, $[(C_2H_5)_2SiO]_4$, $[(C_2H_5)_2SiO]_5$, $[(C_6H_5)_2SiO]_3$, $[(C_2H_5)(C_6H_5)SiO]_3$, $[(C_2H_5)(C_6H_5)SiO]_4$, $[(C_2H_5)(C_6H_5)SiO]_2[(C_2H_5)_2SiO]$ and $[(C_2H_5)(C_6H_5)SiO][(C_2H_5)_2SiO]_2$.

Preferably, the cyclic siloxane of formula (I) is octamethylcyclotetrasiloxane (D4).

According to another specific form of the invention, the polyorganosiloxane (II) is present at up to 80% by weight with respect to the total weight of the composition and is represented by the following formula (X):

(X)

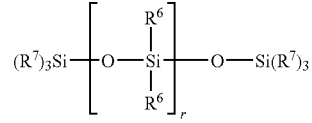

in which:
the symbols $R^6$, which are identical to or different from one another, represent a hydrogen atom, a saturated or unsaturated, linear or branched, $C_1$-$C_{12}$ alkyl radical which is optionally substituted by one or more atoms, such as chlorine and/or fluorine, an optionally substituted $C_1$-$C_{12}$ alkenyl radical, an optionally substituted $C_1$-$C_{12}$ haloalkyl radical, an optionally substituted $C_1$-$C_{12}$ haloalkenyl radical, an optionally substituted $C_3$-$C_8$ cycloalkyl radical, an optionally substituted $C_3$-$C_8$ cycloalkenyl radical, an optionally substituted $C_3$-$C_4$ cyanoalkyl radical or an optionally substituted $C_6$-$C_{12}$ phenyl, alkylphenyl or phenylalkyl radical;

the symbols $R^7$, which are identical to or different from one another, represent an $R^6$ radical as defined above or an —$OR^8$ group, with $R^8$ being a hydrogen atom or a linear or branched $C_1$-$C_{12}$ alkyl radical which is optionally substituted, for example by amino, epoxy or ester functional groups; and $r \geq 1$, preferably $1 \leq r \leq 10\,000$ and more preferably still $1 \leq r \leq 1000$.

According to an advantageous alternative form of the process according to the invention, in stage a-1), the polyorganosiloxane (II) is present at up to 80% by weight with respect to the total weight of the composition and is chosen from the group consisting of:

tetramethyldivinylsiloxane, an α,ω-dihydroxy(polydimethylsiloxane) oil, hexamethyldisiloxane, a polydimethyldisoxane oil, phenylated oils derived from organopolysiloxanes and vinylated oils derived from organopolysiloxanes.

According to a specific form of the invention, when the desired viscosity is achieved, the mixture is neutralized by addition of an acid solution, after having optionally filtered and cooled the mixture. Optionally, the mixture can be distilled in order to remove the molecules of low molecular weight and to recover the residual oil.

The alkaline catalyst (III) is preferably chosen from the group consisting of: alkali metal hydroxides, alkali metal silanolates, alkali metal alkoxides and alkaline siliconates.

According to a specific embodiment of the invention, the alkaline catalyst (III) is a potassium siliconate prepared by heating a mixture composed of hexamethyldisiloxane ($M_2$), of octamethylcyclotetrasiloxane (D4) and of potassium hydroxide.

Acid solutions of use according to the invention are, for example, solutions comprising acetic acid, formic acid, propionic acid, glycolic acid, valeric acid, butyric acid, caproic acid, caprylic acid, capric acid, octanoic acid, lauric acid, myristic acid, stearic acid, palmitic acid, oleic acid, undecylenic acid, hydrochloric acid, HI, HBr, $HClO_4$, $H_2SO_4$, $HNO_3$, $H_3PO_4$, triflic acid, para-toluenesulfonic acid, silyl esters of triflic acid, Lewis acids, acrylic acids, polyacrylic acids, polymethacrylic acids, functionalized organohalosilanes, functionalized organohalosilanes combined with a disilazane, dimethylvinylsilyl acetate or phosphorus-based compounds, such as phosphorus pentoxide, trichloroethyl phosphite, tris(methylsilyl) phosphate and phosphoric acid. A solution based on dry ice can also be envisaged for the acid solution (VII).

According to another preferred embodiment, the acid solution is a silyl solution comprising a mixture of phosphoric acid, of hexamethyldisiloxane ($M_2$) and of octamethylcyclotetrasiloxane (D4).

An additional stage can be envisaged; for example, it is possible to add, at the end of the process, a standard devolatilization stage in order to remove the volatile compounds of low molecular weight, for example by distillation between 175 and 185° C. under a reduced pressure.

Another aspect of the invention relates to a process for the preparation of polyorganosiloxanes by ring-opening polymerization and/or redistribution polymerization of cyclic polyorganosiloxanes as described above in which stages a) and b) and optionally c) are carried out continuously.

The following examples are given by way of indication and cannot be regarded as a limit on the field and spirit of the invention.

Structure of the Cryptands (Cocatalysts):

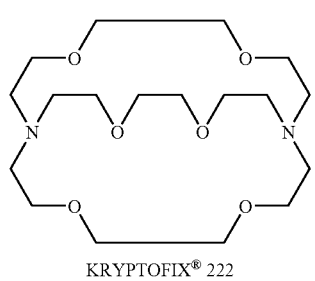

KRYPTOFIX® 222 (VI)

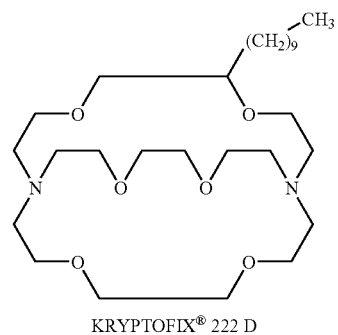

KRYPTOFIX® 222 D (VII)

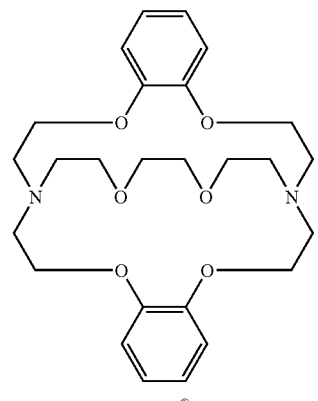

KRYPTOFIX® 222 BB (VIII)

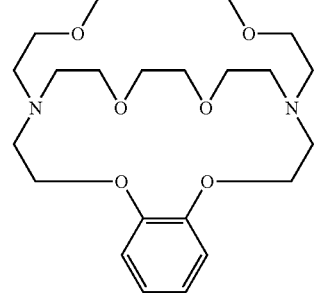

KRYPTOFIX® 222 B (IX)

TDA-1=tris[2-(2-methoxyethoxy)ethyl]amine or tris(3,6-dioxaheptyl)amine

EXAMPLE 1

Batch Reactor Syntheses 500 g (i.e., 1.69 mol) of octamethyltetrasiloxane or D4 and 1.25 g (6.75 mmol) of divinyltetramethyldisiloxane are introduced into a reactor with a capacity of 1 liter which is equipped with an anchor or helical ribbon stirrer. The mixture is subsequently brought to the temperature of the reaction: 150, 160 or 170° C. The catalytic system comprising potassium siliconate comprising 15% by weight of potassium hydroxide and a variable amount of cocatalyst is added at this temperature. The viscosity of the medium is monitored using a torquemeter fitted to a stirrer.

At the end of the reaction, the mixture is cooled down to a temperature of 25° C. and the normal operations of neutralization (neutralizing agent: a silyl solution comprising a mixture of phosphoric acid, of hexamethyldisiloxane (M$_2$) and of octamethylcyclotetrasiloxane (D4)), filtration and devolatilization, to remove the monomer in equilibrium with the polymer and the light cyclosiloxanes (distillation at 180° C. under a reduced pressure of 10 mm of mercury), are subsequently carried out. The measurement of the level of volatile products is between 12.7 and 13.4%, which indicates that thermodynamic equilibrium has been reached. α,ω-Divinylpolydimethylsiloxane oils are obtained.

The results of the tests carried out are given in table I below.

The operating conditions for the test are:

| | |
|---|---|
| Drying nitrogen throughput: | 100 l/h |
| Polymerization temperature: | 170° C. |
| Duration of the test: | 3 hours minimum |
| Feed throughput: | 40 kg/h |
| Amount of potassium hydroxide: | 10 ppm (1 kg/h of a solution of KOH/K siliconate to deliver the equivalent of 10 ppm) |

TABLE I

| Test x-I = invention x-C = comparative | Structure of the cocatalyst used | [KOH] | [Co-catalyst] | Cocatalyst/ KOH molar ratio (y/x) | T(° C.) | Reaction time to equilibrium (minutes) |
|---|---|---|---|---|---|---|
| 1-C | No cocatalyst | 30 ppm | 0 ppm | — | 170° C. | 350 |
| 2-I | (VI) | 30 ppm | 0.5 ppm | 0.0025 | 170° C. | 35 |
| 3-I | (IX) | 30 ppm | 0.5 ppm | 0.0025 | 170° C. | 165 |
| 4-I | (VIII) | 30 ppm | 0.5 ppm | 0.0025 | 170° C. | 210 |
| 5-C | No cocatalyst | 20 ppm | 0 ppm | — | 150° C. | 500 s |
| 6-I | (VI) | 20 ppm | 5 ppm | 0.037 | 150° C. | 35 |
| 7-I | (VI) | 20 ppm | 1 ppm | 0.0071 | 150° C. | 75 |
| 8-C | No cocatalyst | 15 ppm | 0 ppm | — | 150° C. | No reaction |
| 9-I | (VI) | 15 ppm | 0.5 ppm | 0.0050 | 150° C. | 95 |
| 10-I | (VII) | 15 ppm | 0.5 ppm | 0.0050 | 150° C. | 95 |
| 11-C | No cocatalyst | 20 ppm | 0 ppm | — | 170° C. | 200 |
| 12-C | No cocatalyst | 10 ppm | 0 ppm | — | 170° C. | No reaction |
| 13-I | (VI) | 10 ppm | 0.5 ppm | 0.0075 | 170° C. | 30 |
| 14-I | (VI) | 10 ppm | 0.5 ppm | 0.0075 | 160° C. | 60 |
| 15-C | TDA-1 | 20 ppm | 1 ppm | 0.0086 | 150° C. | >400 |

Under these conditions, it is observed that the reaction time to achieve polymerization equilibrium is drastically reduced, even when the cocatalyst/KOH molar ratio (y/x) is less than 0.040. The best results are observed with the cocatalyst Kryptofix® 222 with the structure (VI).

These tests demonstrate that, contrary to what is described in the prior art, the use of a low cocatalyst/KOH molar ratio, even far below 0.040, results in an acceleration in the reaction kinetics while observing a rapid polymerization equilibrium.

It is also found that the comparative test (15-C) with the cocatalyst TDA-1 does not exhibit a good result, confirming the specificity of the method of action of the category of the macroheterocyclic diamines according to the invention.

EXAMPLE 2

Continuous Reactor Synthesis

Octamethyltetracyclosiloxane (D4) is introduced continuously into a continuous reactor composed of the following successive main components: a dryer (nitrogen stripping), a polymerizer (static mixer), a neutralizer (static mixer) and a devolatilization component (for example, falling film or Luwa), the octamethyltetracyclosiloxane being dried in the drying component and then conveyed to the polymerizer. Immediately before entering the polymerizer, the catalyst and the cocatalyst (in the form of a mixture of D4 and of cocatalyst Kryptofix® 222) are introduced into the D4 stream.

-continued

| | |
|---|---|
| Amount of Kryptofix: | 0.5 ppm (1 kg/h of a solution of Kryptofix in D4 or D5 to deliver the equivalent of 0.5 ppm) |
| Operating pressure: | approximately 5 bar. |

The polymer is subsequently neutralized in line by a neutralizing agent of silyl phosphoric acid type. The measurement of the level of volatile products is of the order of 18% and the vinyl content of the α,ω-divinylpolydimethylsiloxane oil is in accordance.

This test demonstrates that the cocatalyst (Kryptofix®)/KOH catalytic system with a molar ratio y/x of 0.0075 is particularly suited to polyorganosiloxane preparation with a continuous process.

What is claimed is:

1. A process for the preparation of polyorganosiloxanes by ring-opening polymerization and/or redistribution polymerization of cyclic polyorganosiloxanes and of linear and/or nonlinear polyorganosiloxanes, said process comprising the following steps:
   a) polymerizing the cyclic polyorganosiloxanes and the linear and/or nonlinear polyorganosiloxanes, by the steps of:
   a-1) preparing a reaction composition at ambient temperature, where the reaction composition comprises:
   (i) at least 20% by weight with respect to the total weight of the composition of at least one cyclic siloxane of following formula (I):

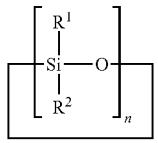
(I)

in which:
n=3, 4, 5, 6, 7 or 8;

R$^1$ is a hydrogen atom, an optionally substituted, linear or branched, C$_1$-C$_{12}$ alkyl radical, an alkenyl radical, an optionally substituted C$_5$-C$_{10}$ cycloalkyl radical, an optionally substituted C$_6$-C$_{18}$ aryl radical or an optionally substituted aralkyl radical, and R$^2$ is a radical R$^1$ or an —OR$^3$ radical, with R$^3$ being a hydrogen atom or an optionally substituted, linear or branched, C$_1$-C$_{12}$ alkyl radical; and (ii) optionally up to 80% by weight with respect to the total weight of the composition of at least one polyorganosiloxane comprising siloxyl units, which are identical to or different from one another, of general formula (II):

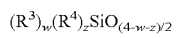

in which:
w and z=0, 1, 2 or 3 and w+z ≦3;

R$^3$ is a hydrogen atom, a linear or branched C$_1$-C$_{12}$ alkyl radical which is optionally substituted by chlorine and/or fluorine, an optionally substituted C$_1$-C$_{12}$ alkenyl radical, an optionally substituted C$_1$-C$_{12}$ haloalkyl radical, an optionally substituted C$_1$-C$_{12}$ haloalkenyl radical, an optionally substituted C$_3$-C$_8$ cycloalkyl radical, an optionally substituted C$_3$-C$_8$ cycloalkenyl radical, an optionally substituted C$_3$-C$_4$ cyanoalkyl radical or an optionally substituted C$_6$-C$_{12}$ phenyl, alkylphenyl or phenylalkyl radical; and R$^4$ is a radical R$^3$ or an —OR$^5$ radical with R$^5$ having the same definition as R$^3$;

a-2) adding a catalytic system to the reaction composition, wherein the catalytic system is composed of x mmol of at least one alkaline catalyst (III) and y mmol of at least one cryptand (IV) which is a macroheterobicyclic diamine, and a-3) adjusting the temperature of the reaction mixture to a temperature of between 100° C. to 190° C.;

b) neutralizing the reaction mixture; and c) optionally devolatilizing the reaction mixture;

wherein for the alkaline catalyst (III), the number of mmol x used meets the following criterion: 0.005≦x≦5 mmol per 500 g of cyclic siloxane (I), and for the cryptand (IV), the number of mmol y used meets the criterion defined by the molar ratio y/x<0.040.

2. The process for the preparation of polyorganosiloxanes by ring-opening polymerization and/or redistribution polymerization of cyclic polyorganosiloxanes and of linear and/or nonlinear polyorganosiloxanes as defined by claim 1, in which the cryptand (IV) is a macroheterobicyclic diamine of general formula (V):

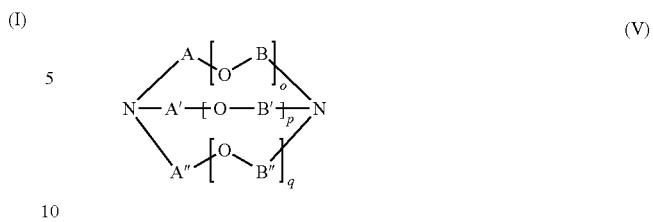
(V)

in which:
o, p and q=1, 2 or 3;

A, A', A", B, B' and B", which can be identical or different, are each groups of formulae:

—CH$_2$—CHR—; —CH$_2$—CHR—CH$_2$—; —CHR—CH$_2$—CH$_2$—;

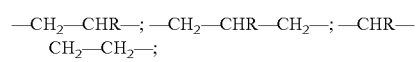

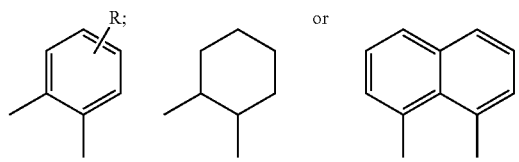

with R being a hydrogen or a linear or substituted C$_1$-C$_{20}$ hydrocarbon radical.

3. The process for the preparation of polyorganosiloxanes by ring-opening polymerization and/or redistribution polymerization of cyclic polyorganosiloxanes and of linear and/or nonlinear polyorganosiloxanes as defined by claim 1, in which the cryptand (IV) is selected from the group consisting of the following molecules (VI) to (IX):

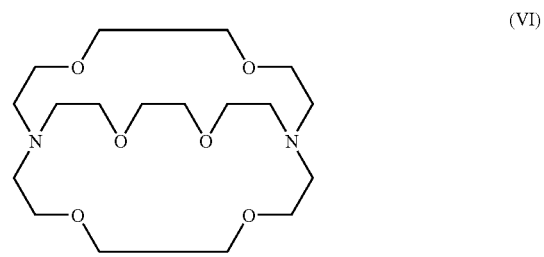
(VI)

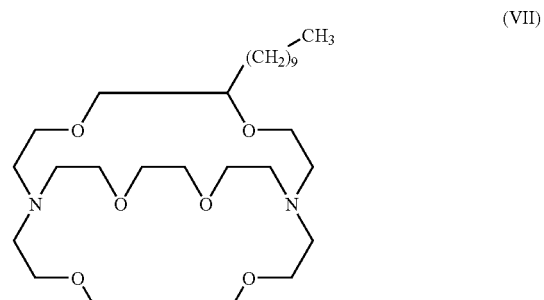
(VII)

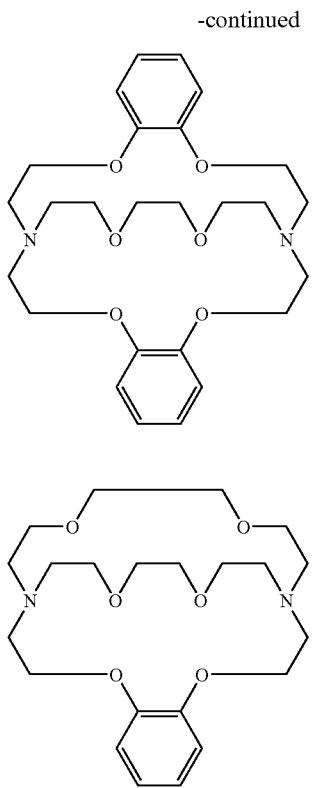

(VIII)

(IX)

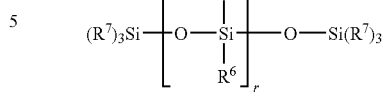

(X)

in which:

R⁶, which are identical to or different from one another, are each a hydrogen atom, a saturated or unsaturated, linear or branched, $C_1$-$C_{12}$ alkyl radical which is optionally substituted by chlorine and/or fluorine, an optionally substituted $C_1$-$C_{12}$ alkenyl radical, an optionally substituted $C_1$-$C_{12}$ haloalkyl radical, an optionally substituted $C_1$-$C_{12}$ haloalkenyl radical, an optionally substituted $C_3$-$C_8$ cycloalkyl radical, an optionally substituted $C_3$-$C_8$ cycloalkenyl radical, an optionally substituted $C_3$-$C_4$ cyanoalkyl radical or an optionally substituted $C_6$-$C_{12}$ phenyl, alkylphenyl or phenylalkyl radical;

R⁷, which are identical to or different from one another, are each an R⁶ radical as defined above or an —OR⁸ group, with R⁸ being a hydrogen atom or a saturated or unsaturated, linear or branched, $C_1$-$C_{12}$ alkyl radical which is optionally substituted; and r≧1.

7. The process for the preparation of polyorganosiloxanes by ring-opening polymerization and/or redistribution polymerization of cyclic polyorganosiloxanes and of linear and/or nonlinear polyorganosiloxanes as defined by claim 6, in which the polyorganosiloxane (II) is present at up to 80% by weight with respect to the total weight of the composition and is selected from the group consisting of:

tetramethyldivinylsiloxane, an α,ω-dihydroxy(polydimethylsiloxane) oil, hexamethyldisiloxane, a polydimethyldisoxane oil, phenylated oils derived from organopolysiloxanes and vinylated oils derived from organopolysiloxanes.

8. The process for the preparation of polyorganosiloxanes by ring-opening polymerization and/or redistribution polymerization of cyclic polyorganosiloxanes and of linear and/or nonlinear polyorganosiloxanes as defined by claim 1, in which the alkaline catalyst (III) is selected from the group consisting of: alkali metal hydroxides, alkali metal silanolates, alkali metal alkoxides and alkaline siliconates.

9. The process for the preparation of polyorganosiloxanes by ring-opening polymerization and/or redistribution polymerization of cyclic polyorganosiloxanes and of linear and/or nonlinear polyorganosiloxanes as defined by claim 1, in which stages a) and b) and optionally c) are carried out continuously.

10. The process for the preparation of polyorganosiloxanes by ring-opening polymerization and/or redistribution polymerization of cyclic polyorganosiloxanes and of linear and/or nonlinear polyorganosiloxanes as defined by claim 1, where in step a-2), the catalytic system is added to the reaction composition at a temperature of greater than or equal to 100° C.

11. The process for the preparation of polyorganosiloxanes by ring-opening polymerization and/or redistribution polymerization of cyclic polyorganosiloxanes and of linear and/or nonlinear polyorganosiloxanes as defined by claim 1, where is step a-3) the temperature of the reaction mixture is adjusted to a temperature of between 140° C. to 180° C.

12. The process for the preparation of polyorganosiloxanes by ring-opening polymerization and/or redistribution poly- 4. The process for the preparation of polyorganosiloxanes by ring-opening polymerization and/or redistribution polymerization of cyclic polyorganosiloxanes and of linear and/or nonlinear polyorganosiloxanes as defined by claim 1, in which the cyclic siloxane of formula (I) is selected from the group consisting of:

octamethylcyclotetrasiloxane, hexamethylcyclotrisiloxane, octaphenylcyclotetrasiloxane, tetramethylcyclotetrasiloxane, tetramethyltetravinylcyclotetrasiloxane, hexamethy-1,1-diphenylcyclotetrasiloxane, [(CH₃)₂SiO]₅, [(CH₃)₂SiO]₆, [(CH₃)₂SiO]₇, [(CH₃)₂SiO]₈, [(CH₃)₂SiO]₉, [(CH₃)(C₂H₅)SiO]₃, [(CH₃)(C₂H₅)SiO]₄, [(CH₃)(C₂H₅)SiO]₅, [(CH₃)(C₂H₅)SiO]₆, [(C₂H₅)₂SiO]₃, [(C₂H₅)₂SiO]₄, [(C₂H₅)₂SiO]₅, [(C₆H₅)₂SiO]₃, [(C₂H₅)(C₆H₅)SiO]₃, [(C₂H₅)(C₆H₅)SiO]₄, [(C₂H₅)(C₆H₅)SiO]₂[(C₂H₅)₂SiO] and [(C₂H₅)(C₆H₅)SiO][(C₂H₅)₂SiO]₂.

5. The process for the preparation of polyorganosiloxanes by ring-opening polymerization and/or redistribution polymerization of cyclic polyorganosiloxanes and of linear and/or nonlinear polyorganosiloxanes as defined by claim 4, in which the cyclic siloxane of formula (I) is octamethylcyclotetrasiloxane.

6. The process for the preparation of polyorganosiloxanes by ring-opening polymerization and/or redistribution polymerization of cyclic polyorganosiloxanes and of linear and/or nonlinear polyorganosiloxanes as defined by claim 1, in which the polyorganosiloxane (II) is present at up to 80% by weight with respect to the total weight of the composition and is represented by the following formula (X):

merization of cyclic polyorganosiloxanes and of linear and/or nonlinear polyorganosiloxanes as defined by claim 1, where step c), optionally devolatilizing the reaction mixture, is performed at a temperature of from 175° C. to 185° C.

13. The process as defined by claim 1, wherein for the alkaline catalyst (III), the number of mmol x used meets the following criterion: $0.005 \leqq x \leqq 1$ mmol per 500 g of cyclic siloxane (I).

14. The process as defined by claim 1, wherein for the cryptand (IV), the number of mmol y used meets the criterion defined by the molar ratio y/x<0.020.

15. The process as defined by claim 6, wherein $1 \leqq r \leqq 10\ 000$.

16. The process as defined by claim 6 wherein $1 \leqq r \leqq 1000$.

17. The process as defined by claim 1, wherein for the cryptand (IV), the number of mmol y used meets the criterion defined by the molar ratio y/x<0.010.

* * * * *